July 29, 1952  L. C. DOLCE  2,604,842
SAUSAGE GRILL
Filed Sept. 8, 1950
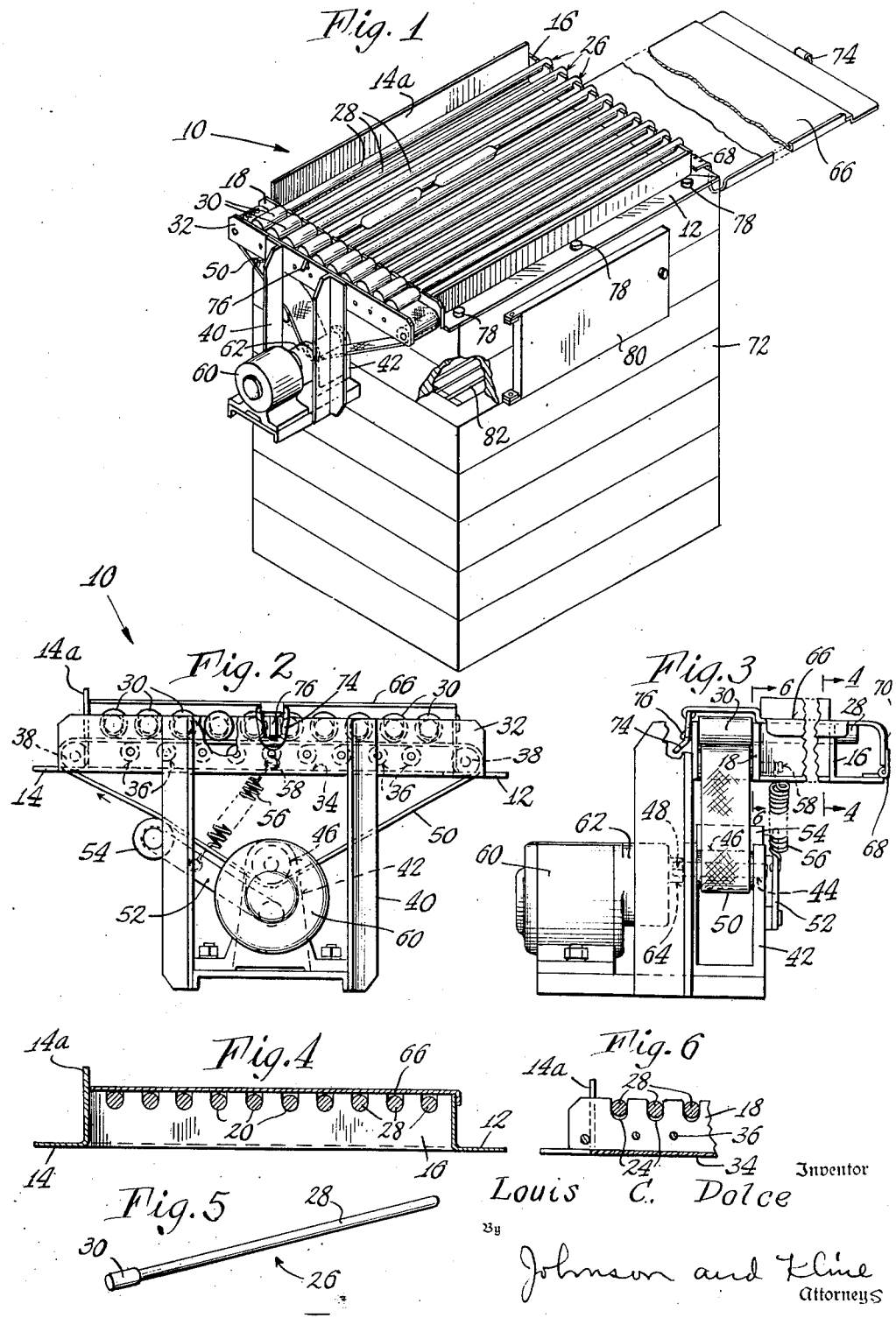
Inventor
Louis C. Dolce
By
Johnson and Kline
Attorneys Patented July 29, 1952

2,604,842

UNITED STATES PATENT OFFICE 2,604,842

SAUSAGE GRILL

Louis Charles Dolce, Danbury, Conn.

Application September 8, 1950, Serial No. 183,786

8 Claims. (Cl. 99—423)

This invention relates to roasting food packages or elements formed in rollable shapes, and is particularly concerned with means for roasting sausages such as wieners or frankfurters, with special reference to devices for this purpose known generally as grills.

Various structures designed to handle sausages and frankfurters during cooking and known as grills have been devised, some of which will turn the sausages slowly and regularly to provide even, all-around heating thereof. This motion is sometimes effected by providing rollers or drums spaced apart by less than the diameter of the sausage to be handled and which rotate in the same direction and between which the sausages are supported and rotated over a fire or other heating means. Devices of this nature which are known at the present time, however, are complex, costly, difficult to assemble and disassemble and exceedingly difficult to maintain in a sanitary condition. Because of the difficulty of keeping such devices clean, they have not come into general use.

This invention has for its object the provision of a sausage supporter and rotator which employs rods or rollers in the above-mentioned fashion, but wherein the rods can be readily lifted out or replaced, and are of such a smooth, uncomplicated outline that cleaning them is reduced to a task of the greatest simplicity.

It is another object of the invention to provide a sausage handling mechanism for roasting purposes which may be portable and wherein the rods are merely held in place and in engagement with their rotating drive in such a way as to be readily lifted out, but in which means are also provided to retain the rods against accidental dislodgement while the device is being moved from place to place.

It is a further object of the invention to provide a sausage grill having sausage supporting and rotating rods wherein the drive for the rods is exceedingly simple and inexpensive, and cooperates readily with the rods without impairing their removability.

An important feature of the inventive structure by which certain of the above objects are obtained consists in belt driven rotating rods having weighted belt engaging portions all of which rest upon and are driven by a single drive belt for movement in concert.

Additional features and advantages will hereinafter appear.

In the drawing:

Figure 1 is a perspective view of a sausage grill, according to the invention, shown in place over a conventional fire pit with the cover plate or rod retainer in inoperative position and condensed due to space limitations.

Fig. 2 is an end elevation of the grill of Fig. 1 with the rod retainer in place.

Fig. 3 is a side elevation of the grill of Fig. 2, condensed to provide for space limitations, part of the frame being broken away to illustrate the latch for the rod retainer.

Fig. 4 is a section taken approximately on line 4—4 of Fig. 3.

Fig. 5 is a perspective view of one of the sausage support rods.

Fig. 6 is a partial section taken approximately on line 6—6 of Fig. 3, with the rod retainer moved to inoperative position.

The present invention relates to a grill 10 which includes a frame consisting of side angle irons 12 and 14 welded at their ends to a tail angle iron 16 at one end, and to a head plate 18 at the other. As shown in the drawing, the angle iron 14 has its vertical leg extending upwardly to a greater extent than the corresponding leg of the member 12 to provide a barrier 14a for a purpose which will hereinafter appear.

The upper edge of tail member 16 has a series of round-bottom apertures in the form of notches 20 which are aligned with corresponding, but slightly deeper, notches 24 in the upper edge of the head plate 18. Rotatably engaged in each pair of notches is a sausage support rod 26 having a long, slender sausage supporting section 28 of constant diameter, and a large, heavy cylindrical driving drum portion 30 at one end.

Mounted opposite the head plate 18 of the frame 10 and spaced somewhat therefrom is a guard plate 32 which, with a connecting bottom strip 34 and the head plate 18, forms a guide slot or channel. The connecting bottom strip 34 may form one leg of an angle iron of which either plate 18 or plate 32 constitutes the other leg if desired, or all three may form parts of an integral channel bar.

The guide channel between plates 18 and 32 is preferably just slightly wider than the length of drum portions 30, so that when the rods 26 are placed with their sausage support sections spanning the frame 10 and resting in the notches 20, 24, the enlarged drum sections of the rods will lie between the plates 18 and 32 to restrain the rods against endwise movement, at the same time permitting ready rotation.

Rotatably mounted in bearing openings in the plates 18 and 32 are idlers or belt support rollers 36, spaced so as to alternate with the notches 24 and situated transversely of the guide slot or channel formed between the plates 18 and 32 at an elevation such that their uppermost horizontal tangents are approximately as high as, or slightly higher than, the lowermost horizontal tangents of the drum sections 30 when the rods 26 are allowed to drop to the bottom of slots 24. At each end of the guide channel is mounted a guide pulley 38 whose uppermost extremity lies approximately in the plane of the common upper tangents of idlers 36, as shown in Fig. 2.

A depending support frame 40 is welded to the outer surface of plate 32 and carries a yoke 42 provided with bearing openings for rotatably supporting the shaft 44 of a drive pulley 46. One end of the shaft 44, extending outwardly through the yoke 42, is non-circular to provide a suitable driving connection as indicated by reference character 48 in Fig. 3. An endless belt 50 having a surface of heat resistant frictional material passes under drive pulley 46 and around guide pulleys 38. The flight of belt 50, which extends between the upper surfaces of guide pulleys 38, passes through the guide channel between plates 18 and 32, over the idlers 36, and is thus disposed in position for receiving the bottom surfaces of drum sections 30 against its upper surface when the rods 26 are in assembled position. This arrangement is clearly shown in Fig. 2 wherein the upper flight of the belt 50 appears straight. Actually this flight will be found to be slightly wavy due to very slight depressions formed between the idlers 36 by the weight of drum sections 30 of rods 26. With belts of ordinary stiffness, however, this undulating configuration is insufficient to appear on any drawing made to a reasonable scale, and for most purposes, the upper flight of the belt may be considered as substantially flat. As is apparent from Figs. 2 and 6, the proportions of the parts are such that the belt will hold the sections 28 of rods 26 spaced from the bottoms of notches 24 to insure that the drum section 30 will be firmly urged by gravity against the belt 50 at all times.

Pivotally mounted at one end on one of the arms of the yoke 42 is a lever 52. The other end of the lever carries a pulley 54 whose axis is parallel to the axes of the other pulleys. A spring 56 connected at one end to the lever 52 and at the other end to a suitable boss 58 on the frame continuously urges the roller 54 against the belt 50 so that there is provided a self-adjusting, constant-tension belt tightener assuring a continuous reliable motion of the belt 50 in response to rotation of the drive pulley 46.

For rotating the drive pulley 46 a suitable hand crank (not shown) having a non-circular recess matching the end 48 of shaft 44 may be provided, or as shown in Figs. 1 to 3, an electric motor 60 with suitable reduction gearing 62 and having a drive element 64 presenting a non-circular recess matching the end 48 of shaft 44, may be mounted on a portion of the depending support frame 40 in driving relation to the shaft end 48 for power operation of the device.

A retaining means for rods 26 is provided in the form of a cover plate 66 hinged at 68 to the margin of frame member 16. When the cover plate is in open position as shown in Fig. 1, it may serve as a light duty support or work table due to the contact of the outer surface of its short vertical portion 70 with the adjacent wall of a fire pit or the like 72, on which the grill 10 is supported. If the grill is to be transported, the plate 66 may be swung to a position overlying the rods 26, as shown in Figs. 2 and 3, and retaining the same against dislodgement from notches 20, 24. A suitable latch may be provided for holding the plate in retaining position, such as the pivoted bail 74 on plate 66 which cooperates with a suitable snap hook 76 on plate 32.

As illustrated in Fig. 1 the grill of this invention may be permanently attached to the fireplace or oven 72 as by bolts 78 if desired, in which case the retaining plate 66 could either be dispensed with or retained as purely a dust cover between periods of use. It should be noted, however, that the grill of the invention is extremely well adapted for use as a portable grill which may be rested by gravity on the top of any suitable heating equipment. The reference character 72 represents a conventional charcoal stove or fire pit including stoking door 80 and a grate 82 for supporting combustible material, and designed to supply heat upwardly for broiling, roasting, toasting and similar forms of cooking, and with which such a portable grill can readily be used. By closing the cover 66 and fastening the latch 74, 76, the grill may be carried about in any position without danger of dislodgement of the rods 26 from notches 20, 24.

In using the grill of this invention, the same is placed with its frame 12, 14, 16, 18 on the upper surface of a suitable fire pit as shown in Fig. 1 and either allowed to rest there by gravity, or it may be fastened permanently in place. The latch 72, 74 is then released and the cover 66 is swung aside on its hinges 68. When the fire on grate 82 is found to be giving sufficient heat, sausages are placed on the grill in the manner illustrated in Fig. 1, i. e. with their axes generally parallel to the axes of rods 26, and lying between adjacent rods so that each sausage is supported between a juxtaposed pair of rods 26, the spacing between them being such that sausages of normal, standard size will assume approximately the position represented by the dotted sectional outline 84 in Fig. 4. When the driving drum 46 is rotated, either by the motor 60, or by a hand crank (not shown), all of the rods 26 will be rotated in the same direction very slowly due to the action of belt 50 on the weighted drum portions 30 of the rods. Preferably the drum 50 will be turned so as to produce counterclockwise motion of the rods as viewed in Fig. 2. In this way the sausages will be slowly rotated over the fire and evenly roasted on all sides. Furthermore, if any of the sausages should happen to walk, i. e. move transversely of the rods 26 because of sticking to the rods or for any reason whatever, at a time when the grill happened to be unattended, the walking would be towards the left in Fig. 2 and the sausages will be arrested by the barrier 14a formed by the upwardly extending portion of frame member 14 to prevent its being thrown off the grill and becoming unusable.

When the cooking process has been completed and it is desired to clean the grill, the rods 26 are merely lifted out of slots 20, 24. The rods are of smooth contour and free from dirt-catching grooves, both in the sausage supporting portions 28 and in the driving drum portions 30, so that ready washing and buffing of the surfaces can be quickly and easily accomplished. Furthermore, with the rods 26 removed, the inner surfaces of the frame pieces 12, 14, 16 and 18 which are exposed to grease and smoke become accessible for ready cleaning. Thereafter the grill is reassembled with equal facility by merely dropping each of the rods 26 into a pair of notches 20, 24 with its drum section 30 lying in the guide channel formed between plates 18 and 32 and resting against the belt 50.

In this connection it will be seen that apertures 20 could take the form of holes which are not cut through to the upper edge of the member 12, since the tips of rods 26 could be placed in such holes by a slight axial movement prior to having the other ends dropped into notches 24. Such a construction, however, is not preferred at present inasmuch as it renders the assembly and removal of the rods significantly less expeditious, and such closed apertures would be somewhat more difficult to clean than the open-topped apertures or notches 20.

By swinging the cover plate 66 into position overlying the rods and fastening the latch 74, 76, the rods 26 are protected against accumulating dirt and dust, and, in case the grill is to be portable, the rods 26 are also held in place against dislodgement from the notches 20, 24 during movement of the device from place to place.

Variations and modifications may be made within the scope of the claims and portions of the improvements may be used without others.

I claim:

1. A grill for supporting and rotating rollable food elements over a heating means, comprising a frame having two spaced series of rod-receiving apertures therein, at least one series of said apertures consisting of notches opening upwardly when the frame is supported in horizontal position for use, one aperture of each series being aligned with an aperture of the other series to form a cooperating pair; a plurality of rods freely and rotatably engaged in said apertures, each in one of said pairs with one end in each aperture of the pair; frictional driving means supported on said frame for movement substantially parallel to and adjacent said series of notches; means at that end of each rod which engages the corresponding notch for engaging and being rotatingly driven by said frictional means, said frictional means being positioned so that said rod-carried engaging means are urged thereagainst by gravity when the grill is in horizontal position for use; and means for driving said frictional means.

2. A grill for supporting and rotating rollable food elements over a heating means, comprising a frame having two spaced series of rod-receiving apertures therein, at least one series of said apertures consisting of notches opening upwardly when the frame is supported in horizontal position for use, one aperture of each series being aligned with an aperture of the other series to form a cooperating pair; a plurality of rods freely and rotatably engaged in said apertures, each in one of said pairs with one end in each aperture of the pair; an endless friction belt having a flight thereof supported on said frame for movement adjacent said series of notches; means at that end of each rod which engages the corresponding notch for engaging and being rotatingly driven by said flight, said flight being positioned beneath said notches whereby said rod-carried engaging means are urged against the upper surface of said flight by gravity when the grill is in horizontal position for use; and means for driving said belt.

3. A grill for supporting and rotating rollable food elements over a heating means, comprising a frame having two spaced series of rod-receiving apertures therein, at least one series of said apertures consisting of notches opening upwardly when the frame is supported in horizontal position for use, one aperture of each series being aligned with an aperture of the other series to form a cooperating pair; a plurality of rods freely and rotatably engaged in said apertures, each in one of said pairs with one end in each aperture of the pair; an endless friction belt having a flight thereof supported on said frame for movement adjacent said series of notches; means at that end of each rod which engages the corresponding notch for engaging and being rotatingly driven by said flight, said flight being positioned beneath said notches whereby said rod-carried engaging means are urged against the upper surface of said flight by gravity when the grill is in horizontal position for use; a plurality of idler rollers extending transversely of said belt beneath said flight so as to maintain said flight substantially level and in contact with all of said rod-carried engaging means; and means for driving said belt.

4. A grill for supporting and rotating rollable food elements over a heating means, comprising a frame having two spaced series of rod-receiving apertures therein, at least one series of said apertures consisting of notches opening upwardly when the frame is supported in horizontal position for use, one aperture of each series being aligned with an aperture of the other series to form a cooperating pair; a plurality of rods freely and rotatably engaged in said apertures, each in one of said pairs with one end in each aperture of the pair; frictional driving means supported on said frame for movement adjacent said series of notches; means at that end of each rod which engages the corresponding notch for engaging and being rotatingly driven by said frictional means, said frictional means being positioned so that said rod-carried engaging means are urged thereagainst by gravity when the grill is in horizontal position for use; means for driving said friction means; and a readily releasable retaining means for overlying said frame and holding said rods engaged in said notches regardless of the position of said grill.

5. A grill for supporting and rotating rollable food elements over a heating means, comprising a frame having two spaced members, each with a series of rod-receiving apertures therein, at least one series of said apertures consisting of notches opening upwardly when the frame is supported in horizontal position for use, one aperture of each series being aligned with an aperture of the other series to form a cooperating pair; a third member constituting part of said frame and spaced slightly from said notched member on the opposite side thereof from said other member to form a guide slot; a plurality of rods freely and rotatably engaged in said apertures, each in one of said pairs and with one end in each aperture of the pair, each of said rods having at one end a smooth surfaced cylindrical enlargement lying within said guide slot and substantially filling the guide slot axially of the rod to prevent inadvertent axial movement of the rod on the frame; frictional driving means supported in said guide slot for movement adjacent said series of notches, said frictional means being positioned so that said cylindrical enlargements are urged thereagainst by gravity when the grill is in horizontal position for use; and means for driving said frictional means.

6. A grill for supporting and rotating rollable food elements over a heating means, comprising a frame having two spaced members, each with a series of rod-receiving apertures therein, at least one series of said apertures consisting of notches opening upwardly when the frame is supported in horizontal position for use, one aperture of each series being aligned with an aperture of the other series to form a cooperating pair; a third member constituting part of said frame and spaced slightly from said notched member on the opposite side thereof from said other member to form a guide slot; a plurality of rods freely and rotatably engaged in said apertures, each in one of said pairs and with one end in each aperture of the pair, each of said rods having at one end a smooth surfaced cylindrical enlargement lying within said guide slot and substantially filling the guide slot axially of the rod to prevent inadvertent axial movement of the rod on the frame; an endless friction belt having a flight thereof supported in said guide slot for movement adjacent said series of notches, said flight being positioned beneath said notches whereby said cylindrical enlargements are urged against the upper surface of said flight by gravity when the grill is in horizontal position for use; and means for driving said belt.

7. A grill for supporting and rotating rollable food elements over a heating means, comprising a frame having two spaced members, each with a series of rod-receiving apertures therein, at least one series of said apertures consisting of notches opening upwardly when the frame is supported in horizontal position for use, one aperture of each series being aligned with an aperture of the other series to form a cooperating pair; a third member constituting part of said frame and spaced slightly from said notched member on the opposite side thereof from said other member to form a guide slot; a plurality of rods freely and rotatably engaged in said apertures, each in one of said pairs and with one end in each aperture of the pair, each of said rods having at one end a smooth surfaced cylindrical enlargement lying within said guide slot and substantially filling the guide slot axially of the rod to prevent inadvertent axial movement of the rod on the frame; an endless friction belt having a flight thereof supported in said guide slot for movement adjacent said series of notches, said flight being positioned beneath said notches whereby said cylindrical enlargements are urged against the upper surface of said flight by gravity when the grill is in horizontal position for use; a plurality of idler rollers extending transversely of said belt within said guide slot and beneath said flight to maintain said flight substantially level and in contact with all of said cylindrical enlargements; and means for driving said belt.

8. A grill for supporting and rotating rollable food elements over a heating means, comprising a frame having two spaced members, each with a series of rod-receiving notches therein, opening generally upwardly when the frame is supported in horizontal position for use, one notch of each series being aligned with a notch of the other series to form a cooperating pair; a third member constituting part of said frame and spaced slightly from one of said notched members on the opposite side thereof from said other notched member to form a guide slot; a plurality of rods freely and rotatably engaged in said notches, each in one of said pairs and with one end in each notch of the pair, each of said rods having at one end a cylindrical enlargement lying within said guide slot and substantially filling the guide slot axially of the rod to prevent inadvertent axial movement of the rod on the frame; an endless friction belt having a flight thereof supported in said guide slot for movement adjacent the series of notches in said one notched member, said flight being positioned beneath said adjacent notches whereby said cylindrical enlargements are urged against the upper surface of said flight by gravity when the grill is in horizontal position for use; means for driving said belt; and a readily releasable retaining means for overlying said frame and holding said rods engaged in said notches regardless of the position of said grill.

LOUIS CHARLES DOLCE.

REFERENCES CITED

The following references are of record in the file of this patent:

UNITED STATES PATENTS

| Number | Name | Date |
|---|---|---|
| 797,268 | Deckert | Aug. 15, 1905 |
| 1,111,870 | Spurgeon | Sept. 29, 1914 |
| 1,642,604 | Cox | Sept. 13, 1927 |
| 2,012,811 | Duffy | Aug. 27, 1935 |
| 2,020,446 | Weisel | Nov. 12, 1935 |
| 2,122,780 | Peyton | July 5, 1938 |
| 2,185,979 | Dumas | Jan. 2, 1940 |
| 2,253,434 | Kernick | Aug. 19, 1941 |
| 2,485,890 | Keljik | Oct. 25, 1949 |
| 2,543,297 | Olmsted | Feb. 27, 1951 |

FOREIGN PATENTS

| Number | Country | Date |
|---|---|---|
| 203,394 | Switzerland | June 1, 1939 |